United States Patent [19]  
Suzuki

[11] 3,840,295  
[45] Oct. 8, 1974

[54] STOP REGULATION SYSTEM FOR MOTION PICTURE CAMERAS
[75] Inventor: Takeshi Suzuki, Okazaki, Japan
[73] Assignee: Minolta Camera Kabushiki Kaisha, Osaka, Japan
[22] Filed: June 8, 1973
[21] Appl. No.: 368,328

[30] Foreign Application Priority Data
June 8, 1972 Japan................................. 47-5711

[52] U.S. Cl..................................... 352/141, 354/43
[51] Int. Cl. ................................................ G03b 7/08
[58] Field of Search ........ 352/141; 95/10 C; 354/43

[56] References Cited
UNITED STATES PATENTS
| | | | |
|---|---|---|---|
| 3,275,399 | 9/1966 | Johnson | 95/10 C X |
| 3,313,224 | 4/1967 | Biedermann | 95/10 C X |
| 3,391,978 | 7/1968 | Reinsch | 352/141 |
| 3,421,812 | 1/1969 | Kubota | 352/141 |

Primary Examiner—Monroe H. Hayes
Attorney, Agent, or Firm—Craig & Antoneli

[57] ABSTRACT

An improvement in light-stop regulating systems for motion picture cameras characterized by a resistance bridge circuit including a photoconductor element designed to be illuminated by incident light reflected from a mirror provided on rotary shutter blades and an ammeter for controlling the stop blade for regulating the light incident on the photoconductor element. The bridge circuit also includes capacitors connected in parallel respectively with two of resistors of the bridge, each one end of which is together connected to one end of the ammeter whose other end is connected to one end of said photoconductor element. There is also provided a time-constant circuit which is connected in parallel with at least one of the capacitors and is formed by a capacitor and a resistor in series, the time-constant circuit being connected with a switch which is inter-locked with the rotary shutter blades so as to operate ON-and-OFF in synchronism with each rotation of the shutter blades and to open automatically when the shutter blades are in the still state.

4 Claims, 5 Drawing Figures

STOP REGULATION SYSTEM FOR MOTION PICTURE CAMERAS

BACKGROUND OF THE INVENTION

The object of this invention is, through improvement of a motion picture camera determining the exposure by receiving reflected light from a mirror provided on its rotary shutter blades, to electrically balance the exposure while the shutter blades are rotating and while they are resting still, and also to electrically compensate the characteristic delay in response by the photoconductor element in each transistion between the rotating state and the resting state of the shutter blades.

In a motion picture camera of such a construction that its light stop, i.e., diaphragm is controlled by sensing with a photoconductive element the light level of the incident light from a cinematographic object reflected by a mirror provided on rotary shutter blades, the mirror sends the light to the photoconductor element intermittently.

However, since the photoconductor element has a slowly responding characteristic, there hardly appears any periodic change of resistance in the photoconductor element during the time the shutter blades are in rotation. On the other hand, while the shutter blades rotate, the incident period of light upon the photoconductor element is cut short by the amount of the incident period of light upon the film, and therefore, the average light value becomes smaller then than the period during which the shutter blades are in the still state.

Therefore, during the rotating period of the shutter blades, it is necessary to compensate for this increasing resistance so as to allow an exposure equal to that for the case of non-consecutive shooting (i.e., frame-by-frame shooting) based on the light value measured when the shutter blades are still.

One of the prior art methods for compensating for such a problem is to divide the face of the mirror on the shutter blades into a plurality of zones, each zone having a different reflection coefficient and to arrange the reflection coefficient of the zone of the mirror which reflects light on the photoconductor element when the shutter blades are resting still to be smaller than the reflecting power of the zone of the mirror which reflects on the photoconductor element when the shutter blades are rotating.

Another method is to provide a screen or the like to cover the zone of the mirror which reflects on the photoconductor element only when the shutter blades are in the resting state so as to lower the reflection coefficient of that part.

A further prior art method is to change over the resistance in a circuit for stop-control current by means of a switch which is interlocked with the shutter release, whereby the circuit is connected and lowers the current while the shutter blades are in the still state.

In such a prior art method based on changing over the resistance by means of a switch, compensation can be well maintained during each continuation of the resting periods and rotating periods, but the slowly-responding characteristic of the photoconductor element, at the transitional time from the resting period to the rotating period, and vice versa, cannot be compensated. And moreover, especially due to the delay in the response at the transient time from the resting period to the rotating period, there has been the drawback that uneven exposures occur when shooting pictures.

FIG. 4 shows a prior art example of a circuit with the abovementioned change-over switch. This camera is designed in such a manner that, when the shutter is released by operation of a shutter release button (not shown), a cam switch 5, which opens and closes in synchronism with rotation of the shutter blade shaft, is closed. This switch 5 compensates for the phenomenon wherein the average light input to the photoconductor element 6 is less when the shutter blades are rotating than when they are still.

Namely, in FIG. 4, while the release button is not pressed, the rotary shutter blades are resting still, and the light reflected by the rotary mirror strikes the photoconductor element 6. While the release button is pressed down, the rotary shutter blades are in rotation and send the light with a periodic alternation to the film and the photoconductor element 6.

In FIG. 5, the solid line indicates the inverse value of the resistance of the photoconductor element 6, with the abscissa indicating time and the ordinate indicating the inverse value of the resistance of the photoconductor element.

In the bridge circuit of FIG. 4, before a time $t = 0$, namely, when the shutter blade is resting still, if exposure factors (film sensitivity, shutter speed, filter density, etc.) are constant, the resistance of the photoconductor element 6 always has a constant value irrespective of the size of the stop aperture to be formed by the stop blades 14 actuated by the rotary torque of an electromagnetic means, for instance, the ammeter M or by other forces controlled by the mechanism for providing said torque.

Assuming the resistances of resistor 16 to be $Z_2$, of resistor 15 to be $Z_3$ and of resistor 17 to be $Z_4$, then the following relation is constituted:

$$R \times Z_4 = Z_2 \times Z_3$$

Next, to consider the transient state when the shutter is released at the time $t = 0$, the switch 5 is periodically opened and closed after the time $t = 0$ by the cam interlocked with the shutter, as abovementioned.

On the other hand, the light incident upon the photoconductor element 6 starts to be cut off intermittently at a specified interval. As a result, the average light incident upon the photoconductor element 6 decreases. At this transient moment $t = 0$, the resistance R of the photoconductor element 6 does not increase immediately to a constant value $r_0$ due to its slowly-responding characteristic, but increases to said value $r_0$ only after a certain period $t0$.

That is, as seen in the curve of FIG. 5 showing the resistance change of the photoconductor element 6 according to the inverse value of resistance, the period of the downward curve indicates a period when the light is incident upon the film and not upon the photoconductor element 6, and the upward curve indicates the period when the light path to the film is intercepted by the shutter and the light is incident upon the photoconductor element 6. Pursuant thereto, the electric potential at a point $a'$ of FIG. 4 also gradually changes.

However, in the case of the conventional circuit shown in FIG. 4, the electric potential at a point $b'$ begins periodic changes immediately after the release, and hence, the balance of the bridge circuit during the period from $t = 0$ to $t = t0$ is broken. Consequently, the ammeter M, and hence, the stop blades, behaves transitionally irregularly and provides an inappropriate uneven exposure.

SUMMARY OF THE INVENTION

This invention relates to an improvement of a stop-regulating system for motion picture cameras, where the abovementioned drawbacks in the change-over device of the electric circuit are improved.

DETAILED DESCRIPTION OF THE INVENTION

Figure 1:
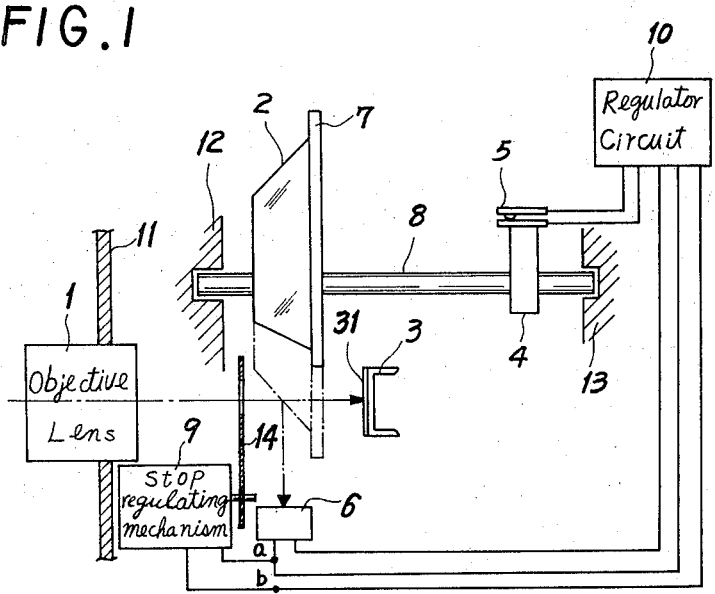
FIG. 1 is a side view of the main part of an example of the mechanism of a motion picture camera embodying the present invention.
Figure 2:
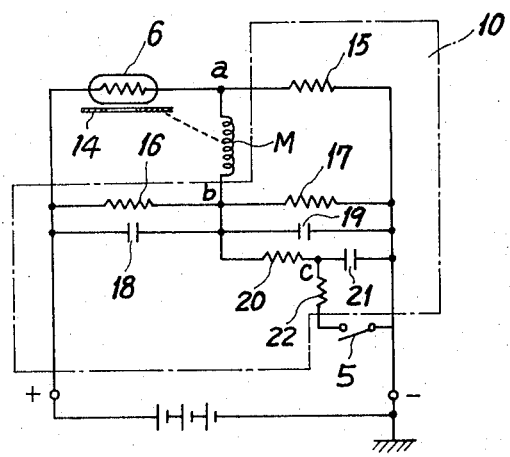
FIG. 2 is a schematic circuit diagram showing a circuit of the example.

Hereunder, explanation will be made of an example of the present invention, as shown in FIGS. 1 and 2. In FIG. 1, numeral 1 indicates an objective lens mounted on a front wall 11 of the motion picture camera. Numeral 2 indicates a cone type mirror fixed on a rotary shutter 7 which is secured to a shaft 8 mounted for rotation in walls 12 and 13 of the casing. A shutter-synchronous switch cam 4 shaped in the form of a known eccentric cam is secured to the shaft 8 so as to open and close a switch 5 periodically in synchronism with the rotary shutter 7. The phase of motion of the cam 4 is so arranged that when the shutter is in the still state, the switch 5 is open and reduces the electric current flowing to an electromagnetic means, for instance, an ammeter M, and when the shutter is in rotation, it periodically opens and closes and charges or discharges capacitors 18, 19 and 21 periodically.

Numeral 3 indicates a film aperture for guiding the film 31. Numeral 6 indicates a photoconductor element in the form of a cadmium sulfide cell or the like and constitutes a bridge circuit jointly with a regulating circuit 10. The light incident from the objective lens 1 and the aperture of the stop blades 14 is reflected by the mirror face 2 when it is in the light path, and strikes the photoconductor element 6. Numeral 9 indicates a regulating mechanism which is interlocked with the meter M and controls stop blades 14 in concert with the regulating circuit 10 in accordance with the value of the light striking the photoconductor element 6.

When the light value striking the photoconductor element 6 increases, the resistance of the photoconductor element 6 decreases, thereby unbalancing said bridge circuit, causing a current to flow in the ammeter M so as to actuate the stop blades 14 to turn in the closing direction, thus operating to give a specified exposure. When the incident light value decreases, the reverse operation takes place.

FIG. 2 is a circuit diagram of the abovementioned embodiment. As illustrated, the photoconductor element 6 and the resistors 15, 16 and 17 constitute the bridge circuit, across whose output terminals $a$ and $b$ is connected the ammeter M. Across both ends of the resistor 16 is connected the capacitor 18, and across both ends of the resistor 17 are connected the capacitor 19 and a series circuit consisting of a resistor 20 and a capacitor 21. Also, across both ends of the capacitor 21 are connected in series a resistor 22 and said switch 5. Said capacitors 18, 19 and 21 and said resistors 20 and 22 together constitute a complex time-constant circuit. The operation of the circuit of the example of this invention will be explained hereunder.

Figure 3:
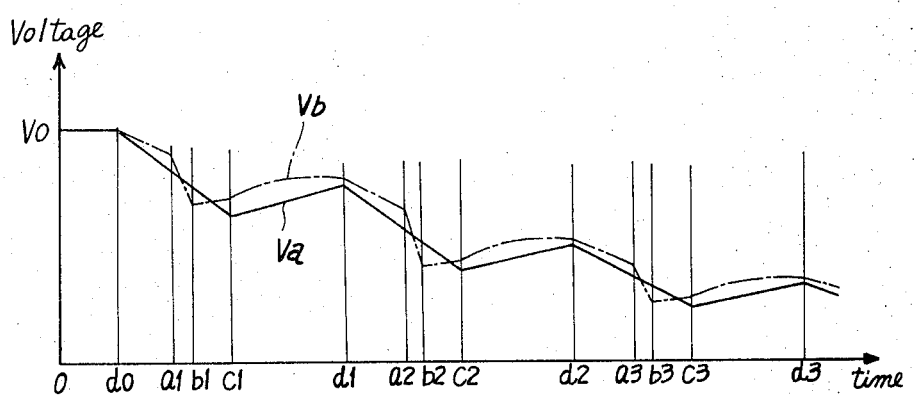
FIG. 3 is a time chart showing changes of voltages at various points of the circuit of FIG. 2.
Figure 4:
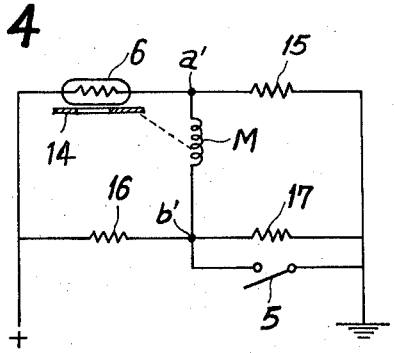
FIG. 4 is a schematic circuit diagram of an example of the prior art.
Figure 5:
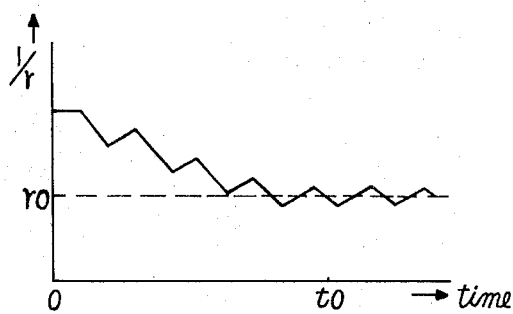
FIG. 5 is a time chart of inverted values of resistance r of a photoconductor element in the example of the prior art.

In the preshooting state, the photoelectric element 6 receives continuously reflected light from the rotary mirror 2, and before the time point $d0$ in FIG. 3, it has a constant resistance r. The switch 5 is held in the OFF state by the shutter-synchronous switch cam 4 fixed on said shaft 8. At this time, the capacitors 18, 19 and 21 are charged up to a normal condition by the source voltage, and the voltage across the terminals of the capacitor 19 has a constant value V0, as seen in FIG. 3, and the voltage across both ends of the capacitor 21 also becomes a similar wave. When the shutter is released and the shooting begins, the shutter 7 starts rotating and the light strikes the photoconductor element 6 during only the periods $o$-$do$, $c1$-$d1$, $c2$-$d2$, $c3$-$d3$, on the abscissa in FIG. 3; while, during the other periods, the light strikes the film, Such movements as described above from the time $t = 0$, at the start of shooting, will be explained in the following in their sequential order referring to FIG. 3, wherein the potential change $Va$ of the point $a$ is indicated by the solid line and the potential change $Vb$ of the point $b$ by the chainline. The light-receiving face of the photoconductor element 6 is intercepted at the time $t = d0$ and its resistance increases, lowering the potential at the point $a$ of FIG. 2. As a result, the bridge circuit becomes unbalanced, and the capacitor 19, which has until then been charged up, is discharged through the meter M, lowering the potential at the point $b$, also. Next, at a time $t = a1$, when the switch 5 is closed, the capacitor 18 quickly starts charging and the capacitors 19 and 21 quickly start discharging, further lowering the potential at the point $b$. However, since the closed period (i.e., $a1$-$b1$) of the switch 5 is very short and it quickly opens at $t = b1$, the charging and discharging start again under a time constant of the circuit consisting of the pairs of capacitors 16 and 18, 17 and 19, and 20 and 21, respectively, and the potential at the point $b$ also goes up. When the time becomes $t = c1$, the light strikes the photoelectric element 6 and its resistance decreases, raising the potential $Va$ at the point $a$, as a result of which, the capacitor 19 is further charged and its potential goes up according to the curve of said time constant. This rising continues until the light striking the photoelectric element 6 is intercepted at $t = d1$.

After time $t = d1$, the change will be similar to that above-described, since the period $t = d0$ till $t = d1$ will take place at consecutive intervals. Since in the circuit of this invention, the resistors 20 and 22 and the capacitor 21 are provided, acute changes of the voltage at the point $b$ due to the open-closed movement of the switch 5 can be made. This change concurs more closely with the voltage change at the point $a$ due to the time constant of the photoelectric element 6.

As can be understood from the above, a change of the potential $Vb$ at the point $b$ approximates the change of the potential $Va$ at the point $a$. Therefore, by appropriately selecting the values of resistors 16, 17, 20 and 22 and of capacitors 18, 19 and 21, it is possible to virtually eliminate the difference of voltages between Va and Vb; and, hence, excessive flow of current into the ammeter M, as well as transient uneven exposures between the still state and rotating state, can be avoided.

What is claimed is:

1. A light-stop regulating mechanism for motion picture cameras including a photoconductive element, a mirror provided on rotary shutter blades for directing light on said photoconductive element and a film and electromagnetic means for controlling the light incident on said photoconductive element, comprising a resistor bridge circuit having three resistors and said photoconductor element in respective legs thereof, first and second capacitors connected across respective resistors of adjacent legs of said bridge, said electromagnetic means having an ammeter including a coil connected between one end of said phtotoconductive element and the point of connection of said first and second capacitors across the output of said bridge, and time constant circuit means connected across one of said first and second capacitors and responsive to rotation of said shutter blade for controlling the time constant of said bridge circuit, said time constant circuit means including a third capacitor and a further resistor connected in series across said one of said first and second capacitors and a switch interlocked with said rotary shutter blade and connected across said third capacitor so as to open and close in synchronism with each rotation of the shutter blade and open automatically when said shutter blade is in the still state.

2. A light-stop regulating mechanism as defined in claim 1 wherein a source of direct current voltage is connected across said respective resistors of adjacent legs of said bridge.

3. A light-stop regulation mechanism as defined in claim 2 wherein said electromagnetic means includes a movable stop blade for controlling the light passing to said mirror.

4. A light-stop regulation mechanism as defined in claim 3 wherein a further resistor is connected in series with said switch.

* * * * *